United States Patent Office 3,752,831
Patented Aug. 14, 1973

3,752,831
ANTHRAQUINONE DYESTUFFS
Michael Diamantoglou, Erlenbach, Germany, and Hans Peter Koelliker, Munchenstein, Alfred Staub, Binningen, Hans Bosshard, Basel, and Urs Karlen, Magden, Switzerland, assignors to Ciba-Geigy AG, Basel, Switzerland
No Drawing. Filed Apr. 26, 1971, Ser. No. 137,656
Claims priority, application Switzerland, Apr. 28, 1970, 6,352/70
Int. Cl. C09b 1/50
U.S. Cl. 260—376                 5 Claims

ABSTRACT OF THE DISCLOSURE

Anthraquinone dyestuffs which are sparingly soluble in water and are free of groups which dissociate in water to give an acid reaction and impart solubility in water, of the Formula I

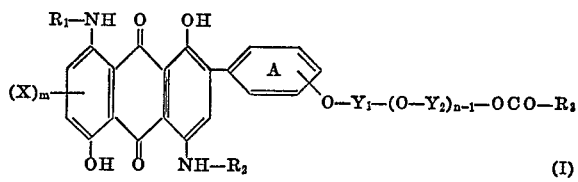

in which $R_1$ and $R_2$, independently of one another, each denote hydrogen or a lower alkyl group, X denotes hydrogen or halogen, $Y_1$ and $Y_2$, independently of one another, each denote a lower alkylene group which is optionally substituted by a hydroxyl group or a lower alkoxy group, $m$ and $n$ each denote one of the numbers 1 or 2, and $R_3$ denotes an optionally substituted aliphatic or aromatic hydrocarbon radical or a lower alkylamino, a cycloalkylamino or an optionally ring-substituted arylamino group, and in which the benzne ring A is optionally substituted further by halogen, or by a lower alkyl or lower alkoxy group.

---

The present invention relates to new anthraquinone dyestuffs which are sparingly soluble in water and can be used as dispersion dyestuffs, processes for their manufacture, the use of the new anthraquinone dyestuffs for dyeing or printing synthetic organic fibre material, especially textile fibres of linear polyesters of aromatic polycarboxylic acids with polyhydric alcohols, or textile fibres of cellulose esters, and, as an industrial product, the fibre material dyed or printed with the new dyestuffs.

Valuable anthraquinone dyestuffs have been discovered which are sparingly soluble in water, do not possess any groups which dissociate in water to give an acid reaction and impart solubility in water, and which correspond to the following Formula I

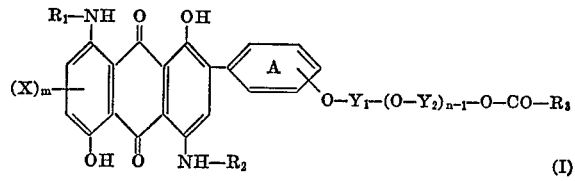

in which $R_1$ and $R_2$, independently of one another, each denote hydrogen or a lower alkyl group, X denotes hydrogen or halogen, $Y_1$ and $Y_2$ independently of one another each denote a lower alkylene group which is optionally substituted by a hydroxyl group or a lower alkoxy group, $m$ and $n$ each denote one of the numbers 1 or 2 and $R_3$ denotes an optionally substituted aliphatic or aromatic hydrocarbon radical or a lower alkylamino, a cycloalkylamino, or an optionally ring-substituted arylamino group, and in which the benzene ring A can op- tionally be substituted further by halogen or by a lower alkyl or lower alkoxy group.

Here, and in the subsequent text, the term "lower" used in conjunction with "alkyl," "alkoxy" and "alkylene" denotes radicals, or constituents of groups, of this type which do not have more than 5 carbon atoms, but above all 1, 2 or 3 carbon atoms, or 2 or 3 carbon atoms respectively.

Groups which dissociate in water to give an acid reaction and impart solubility in water, these groups being excluded from the new dyestuffs, denote here, and in the following text, the known substituents which impart an anionic character to the dyestuffs, for example sulphonic acid groups, carboxylic acid groups and phosphonic acid groups.

If $R_1$ and $R_2$ denote a lower alkyl group, then this is, for example, the methyl, ethyl, iso-propyl or sec. butyl group; however, $R_1$ and $R_2$ preferably denote hydrogen.

X is preferably hydrogen. If X represents halogen, it is, for example, bromine, fluorine or chlorine.

If the benzene nucleus A is further substituted by lower alkyl or alkoxy groups, these are especially the methyl or ethyl group, or the methoxy or ethoxy group, respectively. Possible halogen substituents of the benzene ring A are, for example, fluorine, bromine or above all chlorine. Preferably, however, the benzene nucleus A is not substituted further, and the

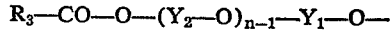

grouping is in the p-position relative to the bond of the benzene ring A to the anthraquinone radical.

The lower alkylene groups $Y_1$ and $Y_2$ can be straight-chain or branched; in the former case, they are preferably the 1,2-ethylene or 1,3-propylene group, and in the latter case, for example, the 2-methyl-1,3-propylene or 2,2-dimethyl-1,3-propylene group. If they are substituted by a hydroxyl group, they are, especially, the 2-hydroxy-1,3-propylene group. If they are substituted by a lower alkoxy group, they represent, for example, a 2-methoxy-1,3-propylene or 2-ethoxy-1,3-propylene group. $Y_1$ and $Y_2$ preferably denote unsubstituted lower alkylene radicals.

If $R_3$ represents an aliphatic hydrocarbon radical, then this is, for example, a straight-chain or branch-chain, optionally substituted alkyl or alkenyl group (in the latter case, in particular a $\Delta^2$-alkenyl group) preferably having up to 5 carbon atoms. As substituents, these aliphatic radicals, especially the alkyl groups, can, for example, contain halogen, such as chlorine or bromine, a nitrile group or a lower alkoxy group, and also a carbocyclic ring, especially of aromatic character, such as the phenyl radical, or heterocyclic rings, such as the thienyl-(2), furyl-(2) or tetrahydrofuryl-(2) radical.

If $R_3$ denotes an aromatic hydrocarbon radical, this radical preferably belongs to the benzene series; it can contain customary non-ionisable ring substituents. As such substituents, nitro groups, lower alkoxy groups, lower alkyl groups or halogens, such as fluorine, chlorine or bromine, may for example be mentioned.

If $R_3$ denotes a lower alkylamino group, this is for example, the methylamino or ethylamino group.

Possible cycloalkylamino groups representing $R_3$ are, for example, amino groups substituted by cycloalkyl radicals having, preferably, a 5-membered or 6-membered ring, and especially the cyclohexylamino groups.

A possible arylamino group representing $R_3$ is, in particular, the phenylamino group. As ring substituents, this phenylamino group can contain customary non-ionisable substituents, preferably lower alkyl groups, and halogen such as fluorine, chlorine or bromine.

In preferred anthraquinone dyestuffs of the Formula I, $R_3$ denotes a lower alkyl group or a phenyl radical which is optionally substituted by halogen or by a lower alkyl group.

The new anthraquinone dyestuffs of the Formula I are obtained if an anthraquinone compound of the Formula II

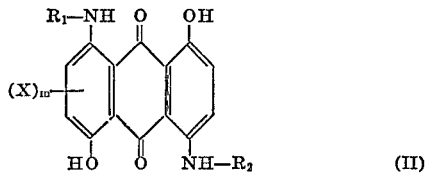

in which $R_1$, $R_2$, $m$ and $X$ have the meaning given under Formula I, are oxidised to give the corresponding quinone-imine compound and the latter is reacted with a compound of the Formula III

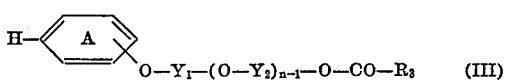

in which what has been stated under Formula I applies to A, $Y_1$, $Y_2$, $R_3$ and $n$, the starting substances being so chosen that the final dyestuff does not possess any groups which dissociate in water to give an acid reaction and confer solubility in water.

Suitable 1,5-dihydroxy-4,8-diamino-anthraquinones of the Formula II for carrying out this process are, for example, 1,5-dihydroxy-4,8-diamino-anthraquinone,
1,5-dihydroxy-4,8-bismethylamino-anthraquinone,
1,5-dihydroxy-4,8-bisethylamino-anthaquinone,
1,5-dihydroxy-4,8-bis-isopropylamino-anthraquinone,
1,5-dihydroxy-4,8-diamino-6,7-dichloro-anthraquinone and
1,5-dihydroxy-4,8-diamino-7-bromo-anthraquinone.

The compounds of the Formula III can be manufactured in a known manner, for example by reaction of a compound of the Formula IV

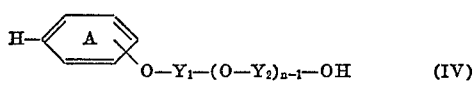

with a compound which introduces the acyl radical $R_3$—CO—, in which $R_3$ has the meaning given under Formula I.

Suitable acylating agents of this nature are, for example, the anhydrides of lower carboxylic acids, such as acetic anhydride or propionic anhydride, the chlorides and bromides of aliphatic and aromatic carboxylic acids, for example acetyl, propionyl or benzoyl chloride or bromide, and also lower alkylisocyanates, such as methylisocyanate, cycloalkylisocyanates, such as cyclohexylisocyanate, or arylisocyanates, such as phenylisocyanate, chlorophenylisocyanate or methylphenylisocyanate.

The oxidation of 1,5-dihydroxy-4,8-diaminoanthraquinone compounds of the Formula II to give the corresponding quinone-imines which are capable of addition takes place according to methods which are in themselves known, in acid solution or suspension, for example in 60 to 100% strength sulphuric acid, using oxidising agents, such as manganese dioxide, lead dioxide, chromic acid, nitric acid, lead tetraacetate or potassium persulphate or permanganate, at temperatures of 0 to 30° C.

The reaction of the quinone-imines of 1,4-dihydroxy-5,8-diamino-anthraquinones of the Formula II with the compounds of the Formula III to give the anthraquinone dyestuffs according to the invention, of the Formula I, is suitably carried out in acid solution, for example in phosphoric acid, or preferably in 60 to 100% strength sulphuric acid.

The compounds of the Formula III preferably react in the p-position to the ether grouping. If this position is occupied by a substituent, bonding to the anthraquinone nucleus preferentially takes place in the o-position.

The addition products produced in this reaction can be precipitated by pouring the reaction mixture into ice water or into inert organic solvents which are miscible with water, such as acetic acid or lower alkanols, and can suitably be isolated by filtration.

Anthraquinone dyestuffs of the Formula I, in which X denotes hydrogen, can also be manufactured if a disulphonated anthraquinone compound of the Formula V

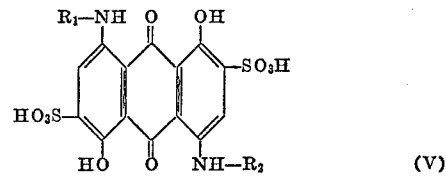

in which $R_1$ and $R_2$ have the meaning given under Formula I, are reacted with a compound of the above Formula III to give a monosulphonated anthraquinone compound of the Formula VI

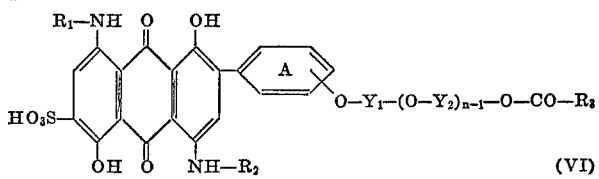

and the sulphonic acid group in this monosulphonated anthraquinone compound is split off, the starting substances being so chosen that the final dyestuff does not possess any groups which dissociate in water to give an acid reaction and impart solubility in water.

The reaction of the anthraquinone compounds of the Formula V with the compounds of the Formula III is suitably carried out in the presence of boric acid and 60 to 100% strength sulphuric acid and can be performed at temperatures between 0 and 40° C.

The splitting off of the sulphonic acid group in the compounds of the Formula VI is preferably effected by treating these compounds with a reducing agent, suitably in an aqueous-organic, advantageously aqueous-alcoholic, ammoniacal solution of sodium hydrosulphite or sodium dithionite at 20 to 100° C.

A further process for the manufacture of anthraquinone dyestuffs of the Formula I in which $R_1$ and $R_2$ each denote a lower alkyl group consists of reacting an anthraquinone compound of the Formula VII

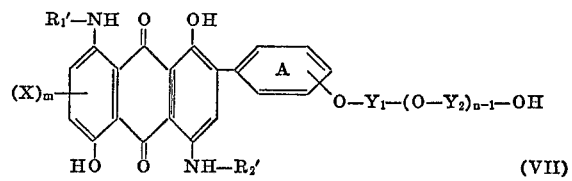

in which what has been stated under Formula I applies to X, A, $Y_1$, $Y_2$, $m$ and $n$, and $R_1'$ and $R_2'$ each denote a hydrogen atom or preferably a lower alkyl group, with a compound which introduces the acyl radical $R_3$—CO—, in which $R_3$ has the meaning given under Formula I, the starting substances being so chosen that the final dyestuff does not possess any groups which dissociate in water to give an acid reaction and impart solubility in water.

Anthraquinone compounds of the Formula VII are, for example, obtained by reaction of the abovementioned quinone-imine compounds of anthraquinone compounds of the Formula II with compounds of the Formula VIII

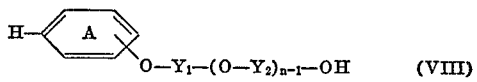

in which what has been stated under Formula I applies to A, $Y_1$, $Y_2$ and $n$, the addition of these compounds being carried out as described above.

Here, again, the abovementioned acylating agents are examples of compounds suitable for introducing the acyl radical R₃—CO—.

The reaction of the anthraquinone compounds of the Formula VII with the compounds which introduce the radical R₃—CO— is appropriately carried out at 0–30° C. in a suitable organic solvent, such as glacial acetic acid, chlorobenzene or dioxane, optionally in the presence of an acid-binding agent, such as sodium acetate, magnesium oxide or pyridine.

The new anthraquinone dyestuffs of the Formula I are deeply coloured, crystalline substances which are sparingly soluble in water. They can be obtained in a pure form, according to the melting point test, by recrystallization from organic solvents, but such a purification is in general superfluous for their use in dyeing.

They are suitable for dyeing or printing synthetic organic fibre material, for example for dyeing fibre material which consists of linear, high molecular esters of aromatic polycarboxylic acids with polyhydric alcohols, such as poly(ethylene glycol terephthalate) or poly-(1,4-cyclohexanedimethylol terephthalate), and also for dyeing fibre material of cellulose diacetate, cellulose 2½-acetate or cellulose triacetate. These dyestuffs can however also be used for dyeing synthetic polyamide fibres, such as fibres of polyhexamethylene adipamide, polycaprolactam or polyaminoundecanoic acid, and also for dyeing polyolefines, especially polypropylene fibres. Furthermore, depending on the composition, they are suitable for dyeing and pigmenting lacquers, oils and waxes, and also cellulose derivatives, especially cellulose esters, such as cellulose acetate, or polyamides, in the melt.

The dyeing of the said fibre materials with the anthraquinone dyestuffs according to the invention, which are sparingly soluble in water, is preferably carried out from aqueous dispersion. It is therefore advisable finely to divide the end substances of the Formula I, which can be used as dispersion dyestuffs, by grinding them with textile auxiliaries such as, for example, dispersing agents and possibly further grinding aids. Subsequent drying yields dyestuff preparations consisting of the textile auxiliary and the dyestuff.

By way of example, the following may be mentioned as advantageously usable dispersing agents from the non-ionic group: addition products of 8 mols of ethylene oxide to 1 mol of p-tert.-octylphenol, of 15 or 6 mols of ethylene oxide to castor oil, of 20 mols of ethylene oxide to the alcohol $C_{16}H_{33}OH$, ethylene oxide addition products to di-[α-phenylethyl]-phenols, polyethylene oxide-tert.-dodecylthioether, polyamine-polyglycol-ethers or addition products of 15 or 30 mols of ethylene oxide to 1 mol of amine $C_{12}H_{25}NH_2$ or $C_{18}H_{37}NH_2$.

As anionic dispersing agents there may be mentioned: sulphuric acid esters of alcohols of the fatty series with 8 to 20 carbon atoms, of the ethylene oxide adducts of the corresponding fatty acid amides, or of alkylated phenols with 8 to 12 carbon atoms in the alkyl radical; sulphonic acid esters with alkyl radicals with 8 to 20 carbon atoms; sulphation products of unsaturated fats and oils; phosphoric acid esters with alkyl radicals with 8 to 20 carbon atoms; fatty acid soaps, and also alkyl-arylsulphonates, condensation products of formaldehyde with naphthalenesulphonic acid, and lignin-sulphonates.

Suitable cationic dispersing agents are quaternary ammonium compounds which contain alkyl or aralkyl radicals with 8 to 20 carbon atoms.

Additionally to the dispersing agents, the dyestuff preparations can also contain organic solvents, especially solvents boiling above 100° C., which are preferably miscible with water, such as mono- and di-alkyl-glycol-ethers, dioxane, dimethylformamide or dimethylacetamide, tetramethylenesulphone or dimethylsulphoxide. The dyestuff, dispersing agent and solvent can advantageously be ground together.

The dyeing of the polyester fibres with the dyestuffs according to the invention, which are sparingly soluble in water, is carried out from aqueous dispersion in accordance with the processes customary for polyester materials. Polyesters of aromatic polycarboxylic acids with polyhydric alcohols are preferably dyed at temperatures of above 100° C., under pressure. The dyeing can however also be carried out at the boiling point of the dye bath, in the presence of dyestuff carriers, for example phenylphenols, polychlorobenzene compounds or similar auxiliaries, or by the thermosol process, that is to say padding with subsequent heat after-treatment, for example heat-setting, at 180–210° C. Cellulose 2½-acetate fibres are preferably dyed at temperatures of 80–85°, whilst cellulose triacetate fibres are advantageously dyed at the boiling point of the dye bath. When dyeing cellulose 2½-acetate fibres or polyamide fibres the use of dyestuff carriers is superfluous. Anthraquinone dyestuffs according to the invention can also be used for printing the said materials according to customary methods.

The anthraquinone dyestuffs of the Formula I which can be used as dispersion dyestuffs are very well absorbed on the abovementioned synthetic organic fibre material, especially on polyethylene glycol terephthalate fibres, and give strong blue dyeings thereon, which have very good fastness to light, washing, rubbing, perspiration, sublimation, solvents and decatising. Mixtures of anthraquinone dyestuffs according to the invention also behave very advantageously in this respect.

Furthermore, anthraquinone dyestuffs according to the invention can also be employed very successfully in mixtures with other dispersion dyestuffs which are fast to sublimation, for dyeing textile material by the padding-thermofixing process. A further particularly noteworthy fact is that dyestuffs of the Formula I give uniform dyeings throughout when dyeing densely woven polyester fabrics or tightly twisted polyester yarns. Furthermore, the new dyestuffs of the Formula I possess the valuable property of allowing very deep, non-streaky dyeings, which furthermore possess good fastness, especially to light and sublimation, to be obtained on texturised polyester fibres, for example "Crimplene." The new anthraquinone dyestuffs also show good stability in liquors and good stability to boiling.

The following examples illustrate the invention.

EXAMPLE 1

28.6 g. of 1,5-dihydroxy-4,8-diamino-anthraquinone are dissolved in 270 ml. of 96% strength sulphuric acid at 20–30° C. The resulting solution is cooled to 0–5° C. and treated with 18 mg. of manganese dioxide added in portions over the course of 30 minutes. The deep blue solution of the quinone-imine formed is then filtered, and the residue is washed with 180 ml. of 96% strength sulphuric acid. Thereafter, the filtered solution is cooled to −30° C. and 36 g. of acetic acid β-phenoxy-ethyl ester are added. After 2 hours the reaction is practically complete. The reaction mixture is subsequently poured into ice, whereupon the dyestuff of the formula

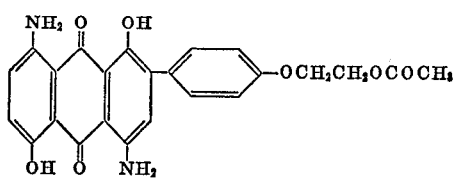

separates out in a fine form. It is filtered off, washed with water until neutral, treated with methanol and dried.

This dyestuff, finely ground with lignin-sulphonate, dyes polyethylene glycol terephthalate fibres from aqueous dispersion in clear, blue shades. The dyeings have very good fastness to light, rubbing and sublimation.

If instead of the 28.6 g. of 1,5-dihydroxy-4,8-diaminoanthraquinone, equivalent quantities of an anthraquinone compound listed in Table 1 below, column II, are used, and instead of the 36 g. of acetic acid β-phenoxyethyl ester equivalent quantities of an ester compound listed in column III of the same table are used, and in other respects the same procedure as indicated in Example 1 is followed, dyestuffs are obtained which dye poly(ethylene glycol terephthalate) fibres in the colour shades, of similar properties, listed in column IV of the same table.

TABLE 1

| Example No. | Anthraquinone compound | Ester compound | Colour shade on poly(ethylene glycol terephthalate) fibres |
|---|---|---|---|
| 2 | 1,5-dihydroxy-4,8-diaminoanthraquinone (NH$_2$, OH, OH, NH$_2$ substituted) | H—⟨C$_6$H$_4$⟩—OCH$_2$CH$_2$OCOC$_3$H$_7$ | Blue. |
| 3 | Same as above | H—⟨C$_6$H$_4$⟩—O—CH$_2$CH$_2$OCOCH$_2$CH$_2$Cl | Do. |
| 4 | do | H—⟨C$_6$H$_4$⟩—O—CH$_2$CH$_2$OCO—⟨C$_6$H$_5$⟩ | |
| 5 | do | H—⟨C$_6$H$_3$(CH$_3$)⟩—O—CH$_2$CH$_2$OCOC$_2$H$_5$ | |
| 6 | do | H—⟨C$_6$H$_3$(OCH$_3$)⟩—O—CH$_2$CH$_2$OCOCH$_3$ | Do. |
| 7 | do | H—⟨C$_6$H$_3$(Cl)⟩—O—CH$_2$CH$_2$OCOCH$_3$ | Do. |
| 8 | do | H—⟨C$_6$H$_4$⟩—O—CH$_2$CH$_2$OCO—⟨C$_6$H$_4$⟩—CH$_3$ | Do. |
| 9 | do | H—⟨C$_6$H$_4$⟩—O—CH$_2$CH$_2$OCO—⟨C$_6$H$_4$(Cl)⟩ | Do. |
| 10 | do | H—⟨C$_6$H$_4$⟩—O—CH$_2$CH$_2$OCO—⟨C$_6$H$_4$⟩—NO$_2$ | Do. |
| 11 | do | H—⟨C$_6$H$_4$⟩—O—CH$_2$CH$_2$OCH$_2$CH$_2$OCOCH$_3$ | Do. |
| 12 | do | H—⟨C$_6$H$_4$⟩—O—CH$_2$CH$_2$CH$_2$OCOCH$_3$ | Do. |
| 13 | do | H—⟨C$_6$H$_4$⟩—O—CH$_2$CH(OH)CH$_2$OCOCH$_3$ | Do. |
| 14 | do | H—⟨C$_6$H$_4$⟩—O—CH$_2$CH(OCH$_3$)CH$_2$OCOCH$_3$ | Do. |
| 15 | do | H—⟨C$_6$H$_4$⟩—O—CH$_2$CH(OH)CH$_2$OCO—⟨C$_6$H$_4$⟩—Cl | Do. |
| 16 | do | H—⟨C$_6$H$_4$⟩—O—CH$_2$CH$_2$O—COCH$_2$CH$_2$Br | Do. |
| 17 | do | H—⟨C$_6$H$_4$⟩—O—CH$_2$CH$_2$CH$_2$O—CH$_2$CH$_2$OCOCH$_3$ | Do. |
| 18 | do | H—⟨C$_6$H$_4$⟩—O—CH$_2$CH$_2$CH$_2$OCH$_2$CH$_2$CH$_2$OCOCH$_3$ | Do. |
| 19 | do | H—⟨C$_6$H$_4$⟩—O—CH$_2$CH$_2$O—CO—CH=CH$_2$ | Do. |
| 20 | do | H—⟨C$_6$H$_4$⟩—OCH$_2$CH$_2$O—CO—⟨C$_6$H$_4$⟩—OCH$_3$ | Do. |

TABLE 1—Continued

| Example No. | Anthraquinone compound | Ester compound | Colour shade on poly(ethylene glycol terephthalate) fibres |
|---|---|---|---|
| 21 | $C_2H_5NH$ ... $OH$, $OH$ ... $NHC_2H_5$ (1,5-dihydroxy-4,8-bis(ethylamino)anthraquinone) | $H-\langle\rangle-O-CH_2CH_2OCOCH_3$ | Greenish-tinged blue. |
| 22 | Same as above | $H-\langle\rangle-O-CH_2CH_2OCOCH_2CH_3$ | Do. |
| 23 | do | $H-\langle\rangle(CH_3)-O-CH_2CH_2OCOCH_3$ | Do. |
| 24 | $CH_3NH$ ... $OH$, $HO$ ... $NHCH_3$ | $H-\langle\rangle-O-CH_2CH_2OCOCH_3$ | Do. |
| 25 | $(CH_3)_2CH-NH$ ... $OH$, $HO$ ... $NH-CH(CH_3)_2$ | $H-\langle\rangle-O-CH_2CH_2OCOCH_3$ | Do. |
| 26 | $NH_2$, $Br$ ... $OH$, $OH$ ... $NH_2$ | $H-\langle\rangle-O-CH_2CH_2OCOCH_3$ | Blue. |
| 27 | $NH_2$, $Cl$, $Cl$ ... $OH$, $OH$ ... $NH_2$ | $H-\langle\rangle-O-CH_2CH_2OCOCH_3$ | Do. |

EXAMPLE 28

28.6 g. of 1,5-dihydroxy-4,8-diaminoanthraquinone are introduced into 270 ml. of 96% strength sulphuric acid at 20–30° C. over the course of 25 minutes. The resulting yellow-brown solution is cooled to 0–5° C. and treated with 18 g. of manganese dioxide. The deep blue solution of the quinone-imine is filtered through a glass frit and the filtered residue is washed with 180 ml. of 96% strength sulphuric acid. Thereafter the filtrate is cooled to —30° C. and 41.6 g. of acetic acid β-(p-methylphenoxy-ethyl) ester are added. The reaction is complete after 2 hours at this temperature. The reaction product of the formula

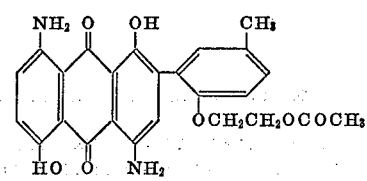

separates out in a crystalline form on stirring the solution into ice. It is filtered off, washed until neutral, again washed with methanol and dried.

After grinding with lignin-sulphonate, this dyestuff dyes fibres of cellulose diacetate and cellulose triacetate, and especially of poly(ethylene glycol terephthalate), from aqueous dispersion in pure blue shades. The dyeings have good fastness to light, sublimation and rubbing.

EXAMPLE 29

28.6 g. of 1,5-dihydroxy-4,8-diaminoanthraquinone are introduced into 270 ml. of 96% strength sulphuric acid at 20–30° C., cooled to 0–5° C. and oxidised with 18 g. of manganese dioxide. The resulting quinone-imine solution is filtered and the residue is washed with 180 ml. of 96% strength sulphuric acid. Thereafter, the filtrate is cooled in —30° C. and 29.3 g. of β-phenoxyethyl-N-methylurethane are added. After 2 hours the reaction mixture is poured onto ice, whereupon the dyestuff of the formula

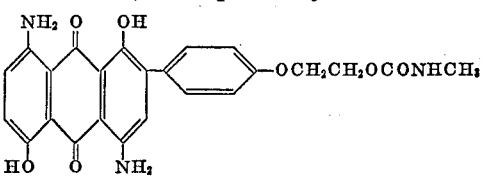

separates out. It is filtered off, first washed with water and then with methanol, and finally dried.

The resulting dyestuff is a blue powder, which after grinding with a dispersing agent dyes poly(ethylene glycol terephthalate) fibres from aqueous dispersion in clear blue shades. The dyeings have good fastness to light and to sublimation.

If, instead of 28.6 g. of 1,5-dihydroxy-4,8-diaminoanthraquinone, equivalent quantities of an anthraquinone compound indicated in Table 2 below, column II, are used, and instead of the 29.3 g. of β-phenoxy-ethyl-N-methylurethane equivalent quantities of a urethane compound indicated in column III of the same table are used, and in other respects the same procedure as indicated in the example is followed, dyestuffs are obtained which dye poly(ethylene glycol terephthalate) fibres in the colour shades indicated in column IV of the same table, these shades having similar properties.

TABLE 2

| Ex. No. | Anthraquinone compound | Urethane compound | Colour shade on poly(ethylene glycol terephthalate) fibres |
|---|---|---|---|
| 30 | 1,5-dihydroxy-4,8-diamino-anthraquinone (NH$_2$, OH, OH, NH$_2$) | H—C$_6$H$_4$—O—CH$_2$CH$_2$—OCONHC$_2$H$_5$ | Blue. |
| 31 | Same as above | H—C$_6$H$_4$—O—CH$_2$CH$_2$—O—CONHC$_3$H$_7$ | Do. |
| 32 | do | H—C$_6$H$_4$—O—CH$_2$CH$_2$—O—CONH—C$_4$H$_9$ | Do. |
| 33 | do | H—C$_6$H$_4$—O—CH$_2$CH$_2$—O—CO—NH—C$_6$H$_5$ | Do. |
| 34 | do | H—C$_6$H$_4$—O—CH$_2$CH$_2$—O—CONHC$_6$H$_{11}$ | Do. |
| 35 | do | H—C$_6$H$_4$—O—CH$_2$CH$_2$—O—CH$_2$CH$_2$—OCONHCH$_3$ | Do. |
| 36 | do | H—C$_6$H$_4$—O—CH$_2$CH$_2$—OCH$_2$CH$_2$CH$_2$OCONHCH$_3$ | Do. |
| 37 | do | H—C$_6$H$_4$—O—CH$_2$CH$_2$CH$_2$—O—CONHC$_3$H$_7$ | Do. |
| 38 | do | H—C$_6$H$_4$—O—CH$_2$CH(OCH$_3$)—CH$_2$OCONHC$_2$H$_5$ | Do. |
| 39 | do | H—C$_6$H$_3$(CH$_3$)—O—CH$_2$CH$_2$OCONHC$_4$H$_9$ | Do. |
| 40 | do | H—C$_6$H$_4$—O—CH$_2$CH$_2$OCONH—C$_6$H$_5$ | Do. |
| 41 | do | H—C$_6$H$_4$—O—CH$_2$CH$_2$OCONH—C$_6$H$_4$—CH$_3$ | Do. |
| 42 | do | H—C$_6$H$_3$(Cl)—O—CH$_2$CH$_2$OCONHCH$_3$ | Do. |
| 43 | 1,8-bis(methylamino)-4,5-dihydroxyanthraquinone (CH$_3$NH, OH, OH, NHCH$_3$) | H—C$_6$H$_3$(Cl)—O—CH$_2$CH$_2$OCONHC$_2$H$_5$ | Greenish-tinged blue. |
| 44 | Same as above | H—C$_6$H$_4$—O—CH$_2$CH$_2$OCONHC$_4$H$_9$ | Do. |
| 45 | do | H—C$_6$H$_4$—O—CH$_2$CH$_2$OCONH | Do. |
| 46 | do | H—C$_6$H$_4$—O—CH$_2$CH$_2$OCH$_2$CH$_2$CH$_2$O—CONHCH$_3$ | Do. |
| 47 | do | H—C$_6$H$_4$—O—CH$_2$CH$_2$CH$_2$O—CH$_2$CH$_2$OCONHCH$_3$ | Do. |

EXAMPLE 48

48 g. of 1,5-dihydroxy-4,8-diamino-anthraquinone-2,6-disulphonic acid are introduced over the course of ½ hour, into a solution of 800 g. of 96% strength sulphuric ample is followed, dyestuffs are obtained which dye poly(ethylene glycol terephthalate) fibres in the colour shades given in column III of the same table, these dyeings having similar properties.

TABLE 3

| Ex. No. | Ester compound or urethane compound | Colour shade on poly(ethylene glycol terephthalate) fibres |
|---|---|---|
| 49 | H—⟨ ⟩—O—CH₂CH₂OCOC₂H₅ | Blue. |
| 50 | H—⟨ ⟩—O—CH₂CH₂OCOC₃H₇ | Do. |
| 51 | H—⟨ ⟩—O—CH₂CH₂OCO—⟨ ⟩ | Do. |
| 52 | H—⟨ ⟩—O—CH₂CH₂CH₂OCOCH₃ | Do. |
| 53 | H—⟨ ⟩—O—CH₂CH₂OCH₂CH₂OCOCH₃ | Do. |
| 54 | H—⟨ ⟩—O—CH₂CH₂OCONHCH₃ | Do. |
| 55 | H—⟨ ⟩—O—CH₂CH₂OCONH—⟨ ⟩ | Do. |
| 56 | H—⟨ ⟩—O—CH₂CH₂OCONHC₄H₉ | Do. |
| 57 | H—⟨ ⟩—O—CH₂CH₂CH₂OCH₂CH₂CH₂CONHCH₃ | Do. | acid and 22 g. of o-boric acid at 40–50° C. The solution is cooled to 10° C. and mixed with 36 g. of acetic acid β-phenoxy-ethyl ester. The mixture is stirred for half an hour at 10° C. and is allowed to come to room temperature over the course of a further half hour. After this time, the reaction mixture is poured onto two litres of ice-methanol (approx. 30% strength methanol solution), warmed to 60° C. and stirred for 4 hours at 60° C. whereupon the dyestuff of the formula

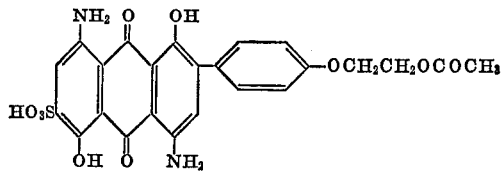

separates out; this is filtered off, washed with 5% strength sodium chloride solution and dried.

33 g. of the dried monosulphonated product are suspended in 400 ml. of 50% strength methanol solution, 40 ml. of concentrated ammonia are added, and 18 g. of sodium hydrosulphite, dissolved in 60 ml. of water, are run in dropwise. Thereafter the mixture is heated for one hour at 40–50° C., whereupon the dyestuff of the formula

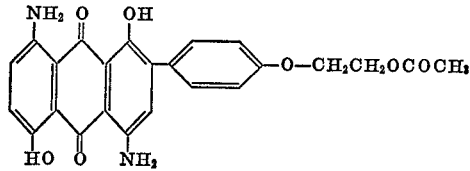

separates out. This is first washed with cold and hot water and then with hot methanol, and is dried. This dyestuff is identical with the dyestuff obtained according to Example 1.

If, instead of the 36 g. of acetic acid β-phenoxyethyl ester, equivalent quantities of one of the ester compounds indicated in column II of the same table are used, and in other respects the same procedure as indicated in the ex-

EXAMPLE 58

43.2 g. of 1,5-dihydroxy-2-(p-β-hydroxyethoxy-phenyl)-4,8-bismethylamino-anthraquinone are dissolved in 400 ml. of pyridine. The resulting solution is cooled to 0–5° C. and 16 g. of acetyl chloride are added dropwise, whilst stirring well. Thereafter the reaction mixture is stirred for further 4 hours at 0–5° C. and then mixed with 600 ml. of methanol, after which the dyestuff of the formula

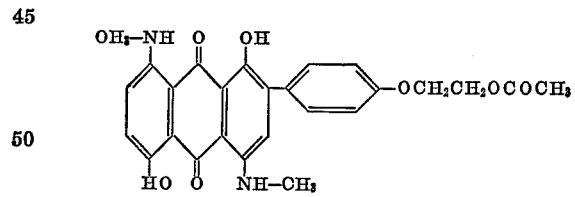

separates out. This is filtered off, washed with methanol and dried.

This dyestuff is identical with the dyestuff obtained according to Example 24.

EXAMPLE 59

2 g. of the dyestuff obtained according to Example 1 are dispersed in 4000 g. of water. 12 g. of the sodium salt of o-phenylphenol, to act as a swelling agent, and 12 g. of diammonium phosphate are added to this dispersion, and 100 g. of poly(ethylene glycol terephthalate) yarn are dyed for 1½ hours at 95–98° C. The dyeing is rinsed and after-treated with aqueous sodium hydroxide solution and a dispersing agent.

An intensely coloured blue dyeing which is fast to light and to sublimation is thus obtained.

If, in the above example, the 100 g. of poly(ethylene glycol terephthalate) yarn are replaced by 100 g. of cellulose triacetate fabric, which is dyed under the indicated conditions and subsequently rinsed with water, an intensely coloured blue dyeing of very good fastness to washing and sublimation is obtained.

EXAMPLE 60

2 g. of the dyestuff obtained according to Example 4 are finely suspended in 2000 g. of water, containing 4 g. of oleylpolyglycol-ether, in a pressure dyeing apparatus. The pH value of the dye bath is adjusted to 4–5 with acetic acid.

100 g. of poly(ethylene glycol terephthalate) fabric are now introduced at 50° C., the bath is heated to 140° C. over the course of 30 minutes, and dyeing is carried out for 50 minutes at this temperature. The dyeing is subsequently rinsed with water, soaped and dried. If these conditions are maintained, a uniform, intensely coloured blue dyeing which is fast to perspiration, light and sublimation is obtained.

The dyestuffs descrbed in the other examples give dyeings of equivalent quality by this process.

EXAMPLE 61

Poly(ethylene glycol terephthalate) fabric is impregnated on a padder, at 40° C., with a liquor of the following composition:

20 g. of the dyestuff obtained according to Example 11, finely dispersed in
7.5 g. of sodium alginate
20 g. of triethanolamine
20 g. of octylphenol-polyglycol-ether and
900 g. of water.

The fabric squeezed out to approx. 100%, dried at 100° C. and subsequently set for 30 seconds at a temperature of 210° C. The dried goods are rinsed with water, soaped and dried. Under these conditions, an intensely coloured blue dyeing which is fast to rubbing, light and sublimation is obtained.

The dyestuffs described in the other examples give dyeings of equivalent quality by this process.

EXAMPLE 62

7 g. of the dyestuff obtained according to Example 1 are ground in a ball mill with 13 g. of sulphite cellulose waste lye powder and 100 ml. of water. The resulting paste is spray-dried. A dry dyestuff preparation is obtained.

EXAMPLE 63

7 g. of the dyestuff obtained according to Example 1 are ground with 4 g. of sodium dinaphthylmethanedisulphonate, 4 g. of sodium acetylsulphate and 5 g. of anhydrous sodium sulphate in a ball mill, to give a fine powder. The resulting dyestuff preparation can be worked into a paste with a little water and can then be passed through a sieve into 4000 l. of a dye bath which contains 3 parts of sodium lauryl sulphate.

EXAMPLE 64

1 g. of the dyestuff obtained according to Example 11 together with 2 g. of sodium lignin-sulphonate and 2 g. of the sodium salt of dinaphthylmethane-disulphonic acid is ground is the presence of water and of quartz sand as a grinding agent, until the average particle size is of the order of magnitude of 1 micron. The resulting finely disperse suspension is separated from the grinding agent by sieving, and is evaporated to dryness.

3 g. of this dyeing preparation are dispersed in 4000 g. of water. 2 g. of sodium dinaphthylmethanesulphonate, 20 g. of diammonium phosphate and 20 g. of the sodium salt of o-phenylphenol as a carrier are added to this dispersion, and a bath for carrier dyeing is thus obtained.

EXAMPLE 65

A turbine stirrer (Homo-Rex type) is used to prepare a liquid mixture of 62 g. of nonylphenol-ethylene oxide adduct (molar ratio 1:12) and 8 g. of ethylene glycol monomethyl ether, and 20 g. of the dyestuff obtained according to Example 11 are slowly added in small portions. A practically anhydrous, viscous dyestuff preparation is obtained.

To prepare a padding liquor, three grams of the dyestuff preparation can be stirred into 1000 millilitres of an aqueous solution which contains 25 g. of 2.5% strength sodium alginate solution and 2 g. of triethanolamine.

We claim:

1. An anthraquinone dyestuff which is sparingly soluble in water and which is free of groups which dissociate in water to give an acid reaction and impart solubility in water, of the formula

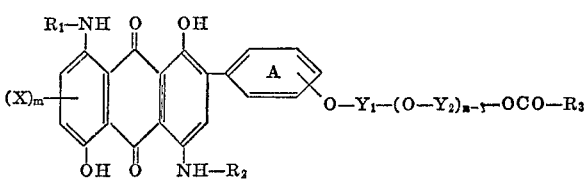

wherein $R_1$ and $R_2$, independently of one another, each denotes hydrogen or lower alkyl, X denotes hydrogen or halogen, $Y_1$ and $Y_2$, independently of one another, each denotes lower alkylene or lower alkylene substituted by hydroxy or lower alkoxy, $m$ and $n$ each denote one of the numbers 1 or 2, $R_3$ denotes alkyl of 1 to 5 carbon atoms, alkenyl of up to 5 carbon atoms, substituted alkyl of 1 to 5 carbon atoms, or substituted alkenyl of up to 5 carbon atoms wherein the substituent is a member selected from the group consisting of (a) bromine, (b) chlorine, (c) cyano, (d) lower alkoxy, (e) phenyl, (f) thienyl-2, g) furyl-2 and (h) tetrahydrofuryl-2, phenyl, phenyl substituted by members selected from the group consisting of (a) nitro, (b) lower alkoxy, (c) lower alkyl, (d) fluorine, (e) chlorine and (f) bromine, methylamino, ethylamino, propylamino, butylamino, cyclohexylamino, phenylamino, or phenylamino substituted by members selected from the group consisting of (a) lower alkyl, (b) fluorine (c) bromine and (d) chlorine, and in which the benzene ring A is optionally substituted further by halogen, lower alkyl or lower alkoxy.

2. An anthraquinone dyestuff according to claim 1 wherein $R_1$ and $R_2$ denote hydrogen.

3. An anthraquinone dyestuff according to claim 1 wherein $R_3$ denotes lower alkyl, phenyl or phenyl substituted by halogen or lower alkyl.

4. An anthraquinone dyestuff according to claim 1 wherein the benzene ring A is not further substituted and the $R_3$—CO—O—$(Y_2-O)_{n-1}$—$Y_1$—O— grouping is in the para position to the bond of the benzene ring A to the anthraquinone radical.

5. An anthraquinone dyestuff according to claim 1 wherein $Y_1$ and $Y_2$ each denotes lower alkylene.

References Cited

UNITED STATES PATENTS 2,338,908   1/1944   Dickey et al. _____ 260—376

FOREIGN PATENTS 2,015,587   10/1970   Germany _____ 260—376

LORRAINE A. WEINBERGER, Primary Examiner

E. J. SKELLY, Assistant Examiner

U.S. Cl. X.R.

8—4, 39, 40; 260—40 R, 329.2, 347.4, 372, 377